United States Patent [19]

Wagner

[11] Patent Number: 5,182,984
[45] Date of Patent: Feb. 2, 1993

[54] AUTOMATED CITRUS FRUIT JUICE PRESS

[75] Inventor: Richard C. Wagner, Frankfort, Ill.

[73] Assignee: Hollymatic Corporation, Countryside, Ill.

[21] Appl. No.: 760,169

[22] Filed: Sep. 16, 1991

[51] Int. Cl.⁵ .............................. A23N 1/02; B30B 9/02
[52] U.S. Cl. ........................................ 99/509; 99/495;
100/98 R; 100/108; 100/213; 100/218
[58] Field of Search .......................... 99/495, 509-513,
99/501, 504; 100/98 R, 108, 213, 218, 125

[56] References Cited

U.S. PATENT DOCUMENTS

| | | | |
|---|---|---|---|
| 2,667,118 | 1/1954 | Nelson | 100/213 |
| 3,429,257 | 2/1969 | Belk | 100/213 |
| 3,858,500 | 1/1975 | Rohm et al. | 99/504 |
| 3,866,528 | 2/1975 | Montagroni | 99/509 |
| 4,154,163 | 5/1979 | Niemann | 99/495 |
| 4,309,943 | 1/1982 | Larsen et al. | 100/98 R |
| 4,309,944 | 1/1982 | Frost, Jr. et al. | 99/509 |
| 4,896,591 | 1/1990 | Bertrand | 100/218 |
| 4,917,007 | 4/1990 | Nelson | 99/495 |
| 4,922,813 | 5/1990 | Compri | 99/495 |
| 4,922,814 | 5/1990 | Anderson et al. | 100/108 |

OTHER PUBLICATIONS

Zumex brochure "Automatic Orange Juice Press", date unknown.
Hollymatic brochure "Hollymatic Dual 34 Juice Machine", date unknown.
Hollymatic brochure "Hollymatic Dual 20 Juice Machine", date unknown.

Primary Examiner—Timothy F. Simone
Attorney, Agent, or Firm—Wood, Phillips, VanSanten, Hoffman & Ertel

[57] ABSTRACT

A pressing apparatus for citrus fruit including upright blades extending radially outwardly from a vertical axis to define V-shaped segments therebetween, the upper edges of the blades being sloped downwardly toward the axis to centrally support a piece of fruit. A press is vertically reciprocated between an upper feed position allowing fruit to be located on the blades and a lower pressing position a selected spacing above the peel ejectors. Peel ejectors within each of the V-shaped segments are pivotally supported for movement between (1) a horizontal ready position when the press is moved to the pressing position and (2) an ejecting position sloped downwardly away from the axis when the press is moved toward the feed position. A feed assembly cyclically feeds fruit to the blades through a chute, and includes a cylindrical enclosure open on one side to the chute and a feed drum supported for rotation about a horizontal axis within the enclosure. The drum includes a side opening, a feed chamber adjacent the side opening and substantially closed on both axial ends, and a staging chamber radially inward from the feed chamber and open thereto through a restricted opening, the staging chamber being substantially closed on one axial end and open on the other end.

36 Claims, 7 Drawing Sheets

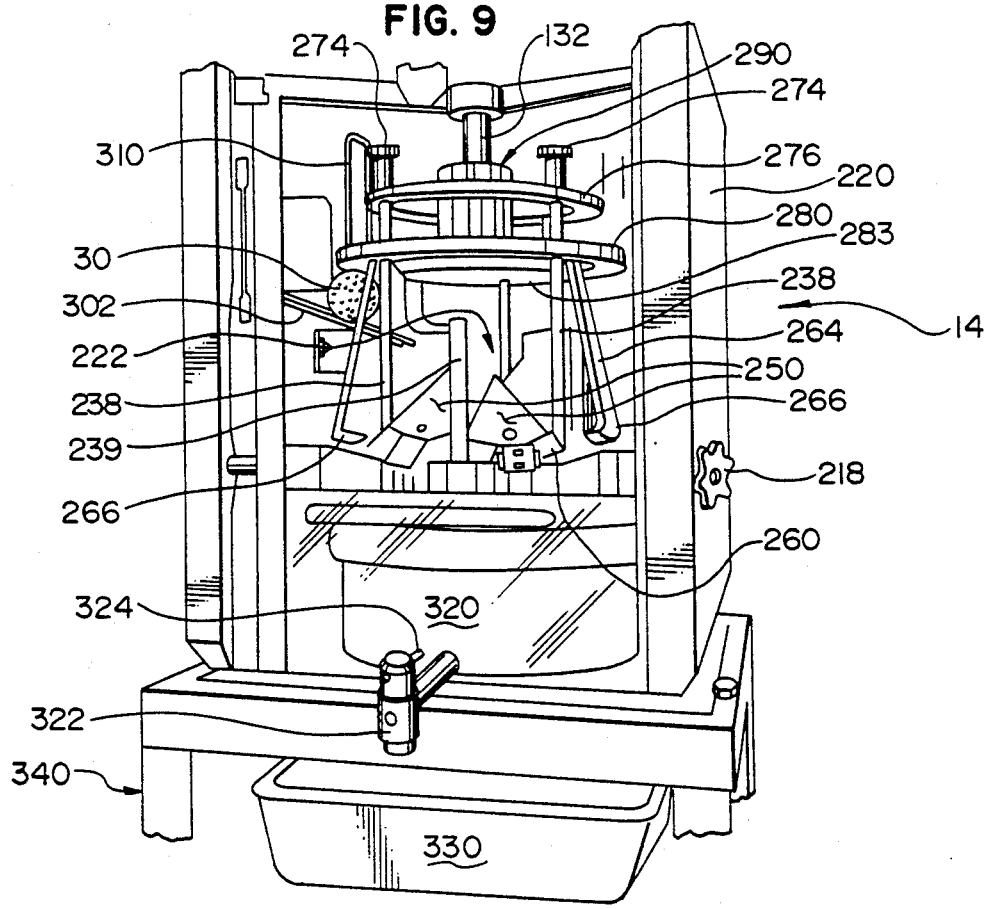
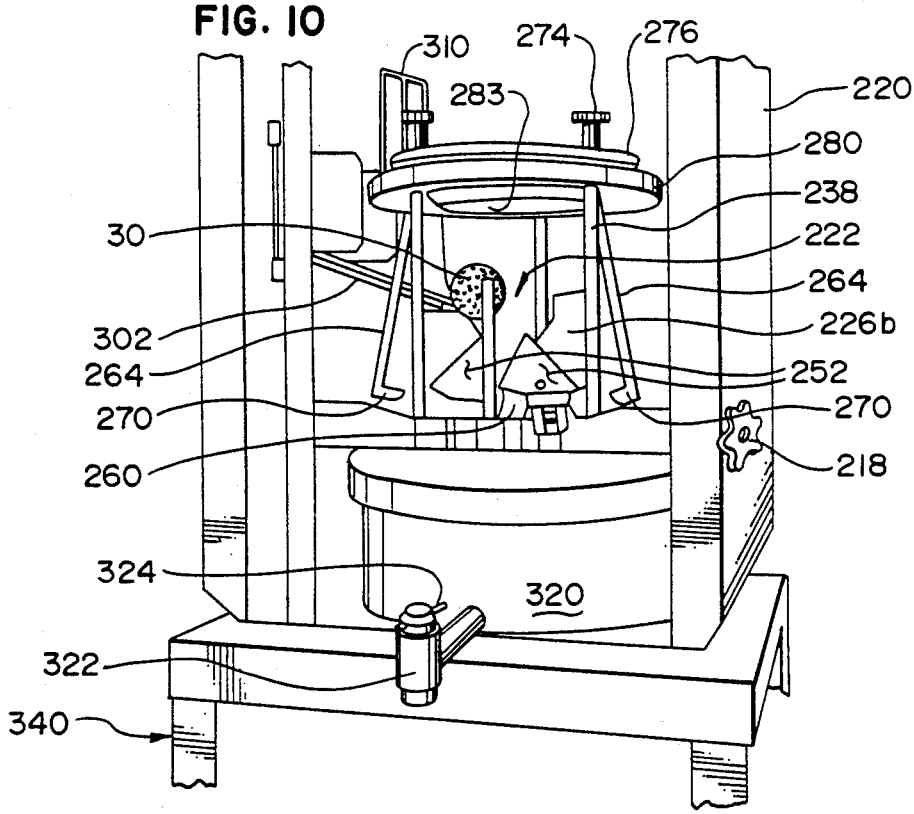

AUTOMATED CITRUS FRUIT JUICE PRESS

BACKGROUND OF THE INVENTION

1. Technical Field

The present invention is directed toward an apparatus for making citrus juice, and more particularly toward an apparatus for automatically feeding and pressing citrus fruit to extract the juice therefrom.

2. Background Art

Machines for making fresh juice from citrus fruit are widely used. Frequently, grocery stores or the like will even place such machines in an area where they can be seen so that customers can actually see the juice being made and thereby rely on the freshness of the juice. In such installations, it is, of course, desirable to allow that multiple pieces of fruit can be handled with minimal operator intervention.

One structure which has been used severs the fruit in half and then extracts the juice from each half by inserting a generally hemispherical rotating member into the peel. This structure is not, however, readily adaptable for different conditions, inasmuch as the hemispherical members have a fixed diameter. Therefore, the structure cannot readily be adapted to different fruit conditions. That is, different batches of even a single type of fruit can have generally different dimensions (e.g., different diameters, different peel thickness) depending on its source. Since making good citrus fruit juice requires the right amount of squeeze (squeeze too much and peel oil is introduced into the juice to adversely effect its taste, squeeze too little and some of the desired juice is not extracted from the fruit), this structure will at best approximate ideal operation only when the hemispherical members happen to match the particular batch of fruit being pressed. Further, this structure is clearly not readily adaptable for use in making juice from different types of fruit (for example, in a structure built to make orange juice, the hemispherical members will be too large to make lemonade and too small to make grapefruit juice).

Another structure which has been used to make citrus fruit juice crushes an entire piece of fruit between two meshing concave members, with the juice being extracted therefrom through a tube which is inserted through the fruit peel as the fruit is crushed. Large amounts of solid pulp material are naturally forced through this tube, and therefore operation of the structure could be hindered by clogging of the tube. Further, cleaning of the tube, not only to allow proper operation but also to maintain sanitary conditions, can be difficult. Still further, the interaction of the concave members of this structure will have a natural tendency to excessively crush the peel along its outer diameter, which could result in the introduction of undesirable peel oil into the juice, adversely effecting its taste.

The present invention is directed toward overcoming one or more of the problems set forth above.

SUMMARY OF THE INVENTION

In one aspect of the present invention, a feed assembly for cyclically feeding citrus fruit to a juice press is provided, including a chute through which the fed citrus fruit drops to the juice press, a cylindrical enclosure open on one side to the chute, and a feed drum supported for rotation about a horizontal axis within the enclosure. The drum includes a side opening, a feed chamber adjacent the side opening and substantially closed on both axial ends, and a staging chamber radially inward from the feed chamber and open thereto through a restricted opening, the staging chamber being substantially closed on one axial end and open on the other end. A hopper is sloped toward the drum staging chamber open end to direct fruit thereto, and the drum is rotated to feed a single piece of citrus fruit to the chute per revolution of the drum.

In another aspect of the present invention, the (1) radial dimension of the feed chamber relative to the drum axis, (2) the spacing between the axial ends of the feed chamber, and (3) the width of the restricted opening are all less than two times the diameter of the fruit to be pressed.

In still another aspect of the present invention, an insert selectively securable within the feed and staging chambers is provided to reduce the effective dimensions of the feed chamber, staging chamber, and restricted opening to accommodate a generally smaller fruit.

In yet another aspect of the present invention, a pressing apparatus is provided, including upright blades extending radially outwardly from a generally vertical upright axis to define V-shaped segments therebetween, where the upper edges of the blades are sloped downwardly toward the upright axis to generally support a piece of fruit centrally to the upright axis. Peel ejectors within each of the V-shaped segments are pivotally supported for movement between a generally horizontal ready position for squeezing and an ejecting position generally sloped downwardly away from the upright axis. A press is vertically reciprocated between an upper feeding position allowing a piece of fruit to be located on the upright blades and a lower pressing position a selected spacing above the peel ejectors. The peel ejectors are disposed in their ready position when the press is moved to the pressing position, and are pivoted to their ejecting position when the press is moved toward the feeding position.

In a further aspect of the present invention, the peel ejectors are biased toward their ejecting position and cam members engage the ejectors to pivot them toward their ready position. Arm members fixed on their upper ends bias the cam members on the arm lower ends clear of the ejectors, and cam surfaces carried with the press engage the arm members as the press is moved from the feeding position to the pressing position engage the supported cam members with the peel ejectors.

In still another aspect of the present invention, the rotation of the drum is synchronized with the vertical reciprocation of the press.

It is an object of the invention to provide a pressing apparatus which is readily adaptable to make juice from different types of fruit having widely ranging sizes, such as grapefruits, oranges, and lemons.

It is another object of the invention to provide an inexpensive pressing apparatus which may be used cost effectively in locations in which only intermittent use to produce limited amounts of juice is desired.

It is still another object of the invention to provide a pressing apparatus which may be easily and inexpensively maintained and operated with minimal operator attention required.

It is yet another object of the invention to provide a pressing apparatus which is readily adaptable to producing the maximum yield of juice with the highest quality taste despite variances in dimensions between batches of fruits from different sources.

BRIEF DESCRIPTION OF THE DRAWINGS

FIGS. 9-13 illustrate the operation of the pressing apparatus, where:

FIG. 9 is a front perspective view of the pressing apparatus immediately prior to feeding a piece of fruit into the apparatus, FIG. 10 is a perspective view similar to a piece of fruit being fed into the apparatus, FIG. 11 is a perspective view similar to FIGS. 9 and 10, showing the fruit already cut and about to be pressed to remove juice therefrom, FIG. 12 is a cross-sectional view showing the press and an ejector with a fruit segment being squeezed therebetween for making juice, FIG. 13 is a cross-sectional view similar to FIG. 12, but showing the ejector in an ejecting position subsequent to pressing the fruit segment.

DESCRIPTION OF THE PREFERRED EMBODIMENT

Structure

Overview

Figure 1:
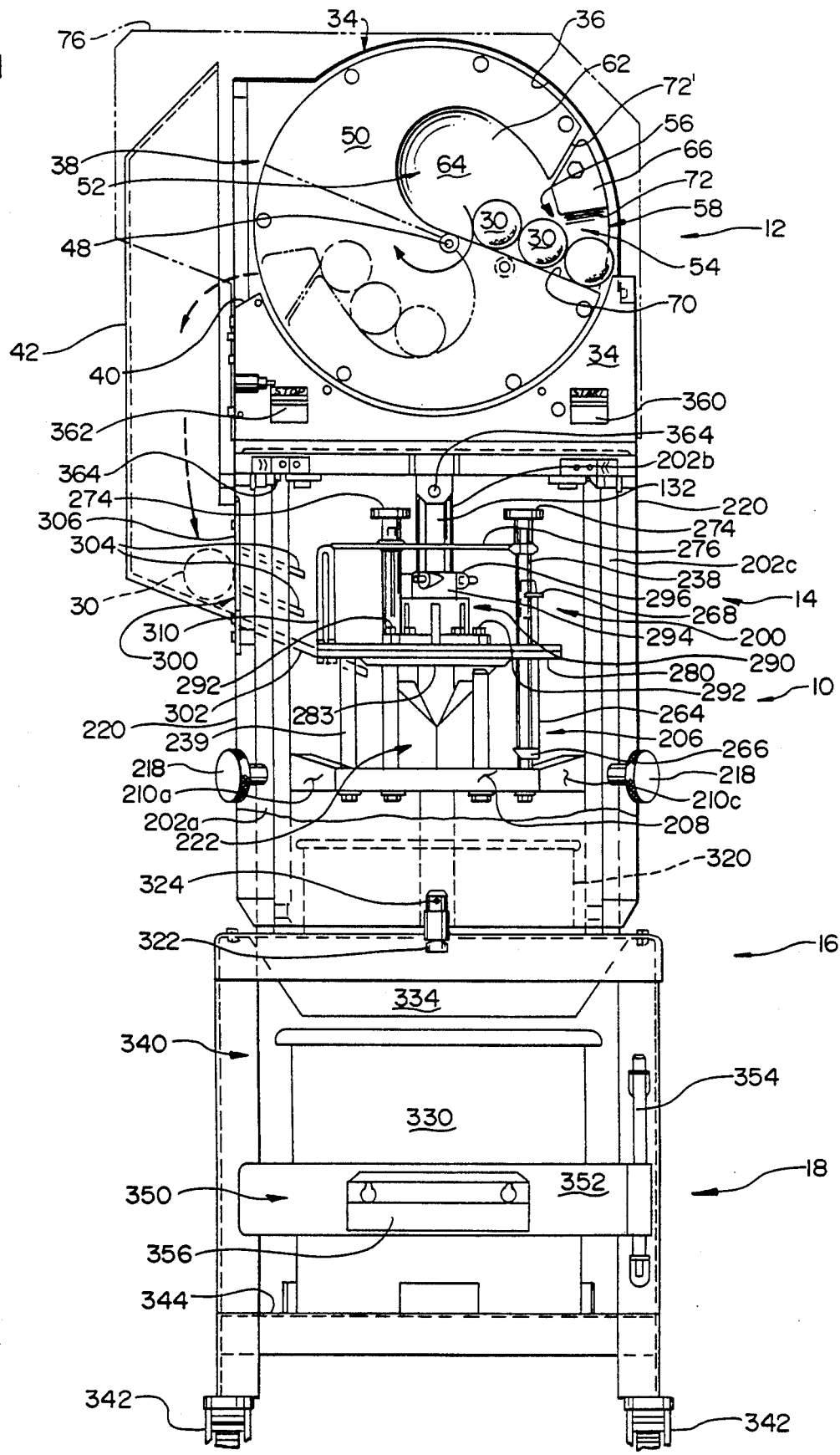
FIG. 1 is a front, partially broken away view of the preferred embodiment of the apparatus of the present invention for making citrus juice.

The preferred embodiment of the present invention is illustrated in FIG. 1. Broadly speaking, the apparatus 10 includes, from the top, a feed assembly 12, a pressing apparatus 14, a collector portion 16, and a transport base 18.

As is described in greater detail hereafter, the feed assembly 12 functions to cyclically provide a single piece of fruit to the pressing apparatus 14, and the pressing apparatus 14 extracts the juice from the peel, both of which are collected by the collecting portion 16. The transport base 18 supports the entire apparatus 10, allowing it to be easily moved when necessary.

Detailed descriptions of the structures of the above mentioned parts of the apparatus 10, as well as of the drive apparatus 20 (see FIGS. 2 and 3) which drives the feed assembly 12 and the pressing apparatus 14 in synchronization, are set forth below:

Feed Assembly

The feed assembly 12 is illustrated in FIG. 1 for feeding oranges 30, and includes a housing 34 defining a generally cylindrical enclosure 36. One side 38 of the enclosure 36 is open with a feed ramp 40 disposed at the bottom and sloped downwardly away from the open side 38 toward a generally vertical feed chute 42.

Suitably supported in the cylindrical enclosure 36 for rotation about a horizontal axis 48 is a cylindrical drum 50. The drum 50 defines an axially extending staging chamber 52 which is closed on one end and open on the front end. A feed chamber 54 is similarly defined in the drum 50 radially outwardly from the staging chamber 52, with the feed chamber 54 being open to the staging chamber 52 through a restricted opening 56 and further being open on its radially outward side 58.

In FIG. 1, an insert 62 is illustrated for converting the feed assembly 12 for oranges 30. The insert 62 includes a flat, generally horizontal portion 64 in the staging chamber 52 and feed chamber 54 to reduce the axial dimension of both chambers 52, 54, and a raised portion 66 extending the full axial depth of the drum 50 to reduce the size of the restricted opening 56 and reduce the tangential dimension of the feed chamber 54. As will be apparent once a full understanding of the present invention is gained, this allows the drum 50 to be constructed with staging and feed chambers 52, 54 sufficiently deep so as to hold a single layer of larger citrus fruits (such as grapefruits), and yet easily converted for use with smaller fruits, such as the oranges 30 shown. Of course, other inserts having different dimensions can also be used to convert the feed assembly 12 for use with still other fruits (such as lemons for making lemonade).

The drum is rotated clockwise so that the chambers 52, 54 follow the axial lead surface 70 where, when the drum 50 approaches the feeding position (shown in phantom in FIG. 1), the following axial feed surface 72 pushes a single piece of fruit disposed in the feed chamber 54. (For making grapefruit juice, the insert 62 would be removed from the drum 50 and the feed surface would then be as indicated by reference number 72'.) Further, as will become apparent, it is preferred that when the drum is in the feeding position the lead surface 70 is sloped down away from the open side 38 of the enclosure 36.

Figure 2:
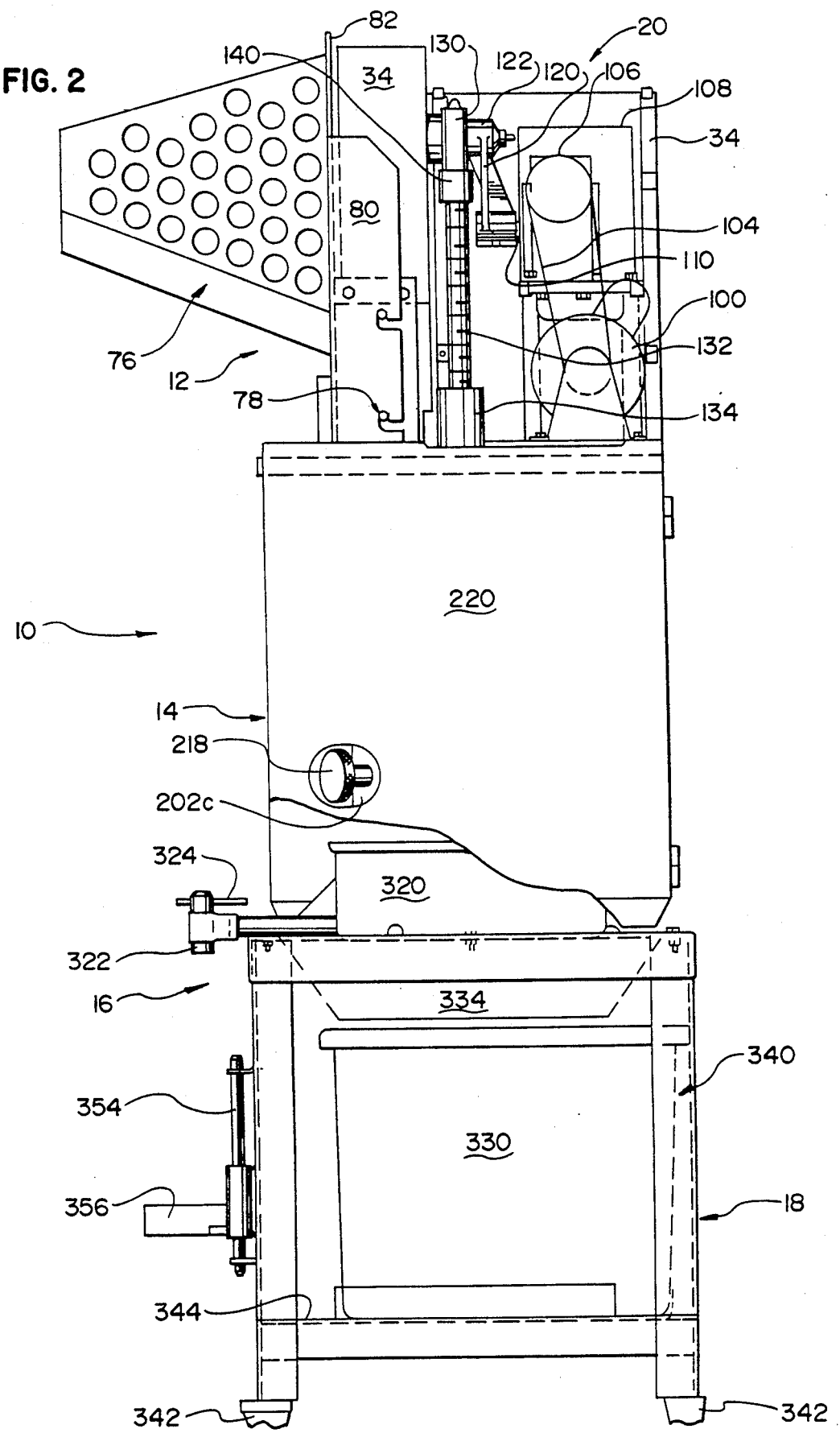
FIG. 2 is a side, partially broken away view of the apparatus for making citrus juice.

A suitable hopper 76 (see FIG. 2, also shown in phantom in FIG. 1) is supported on the apparatus 10 by a suitable connector, such as the pin and slot arrangement 78 on side panels 80 of the hopper 76 as shown in FIG. 2. Mounting the hopper 76 for easy removal such as shown allows for easy access to the feed assembly 12 for cleaning and/or maintenance when desired. Further, the hopper 76 preferably includes a ring portion 82 (see FIG. 2) having an outer diameter substantially equal to the diameter of the drum 50 and an inner diameter substantially equal to the radial spacing of the restricted opening 56 from the horizontal axis 48, so that the ring portion 82 essentially closes the front end of the feed chamber 54 at all positions in its rotation. The hopper 76 is sloped toward the drum 50 as shown in FIG. 2 so that a plurality of pieces of fruit can be loaded in the hopper and then automatically fed to the pressing apparatus 14 as described in further detail hereafter.

Drive Apparatus

Figure 3:
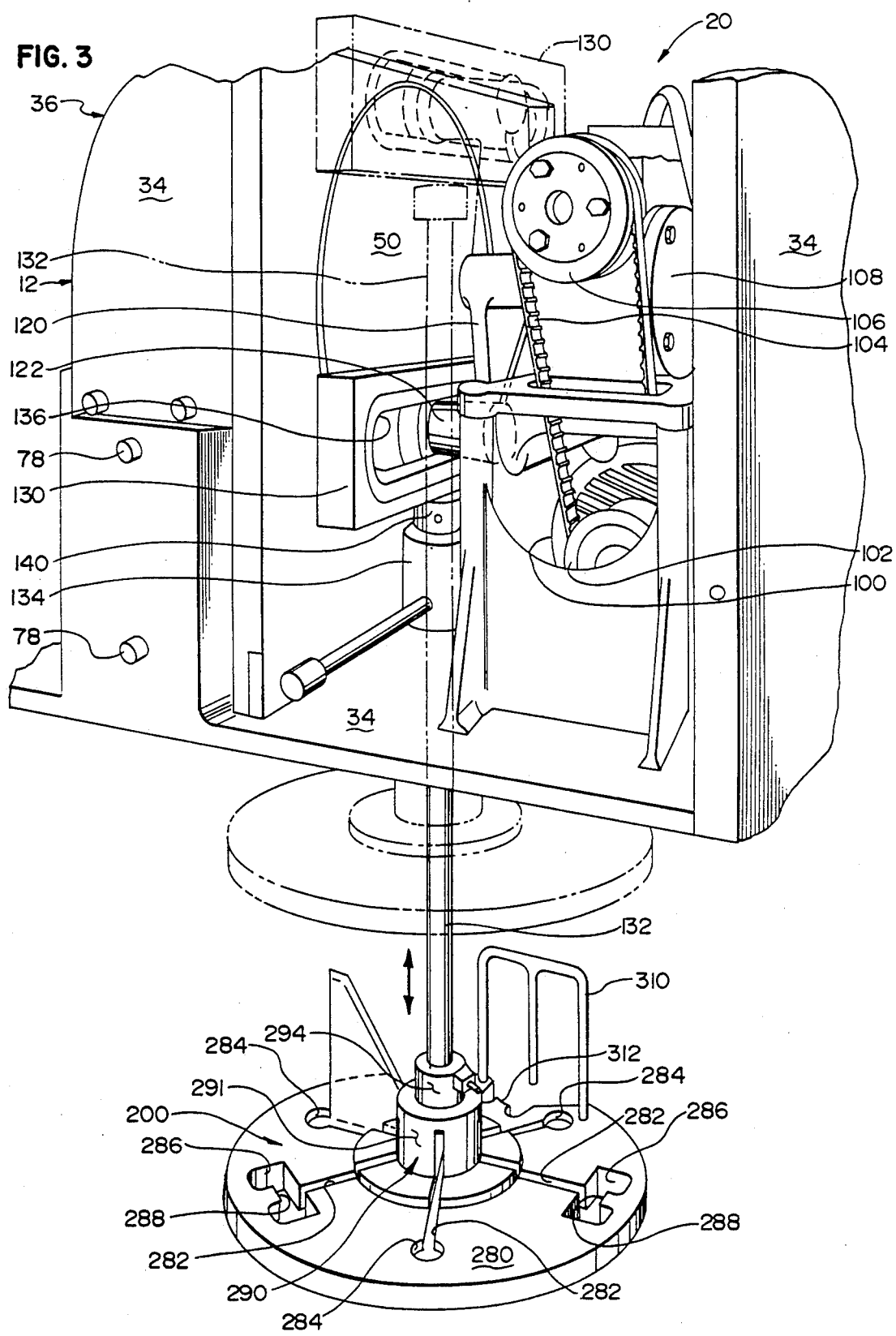
FIG. 3 is a perspective view from the side and rear of the apparatus illustrating the drive structure of the present invention, with the press being schematically illustrated only.
Figure 4:
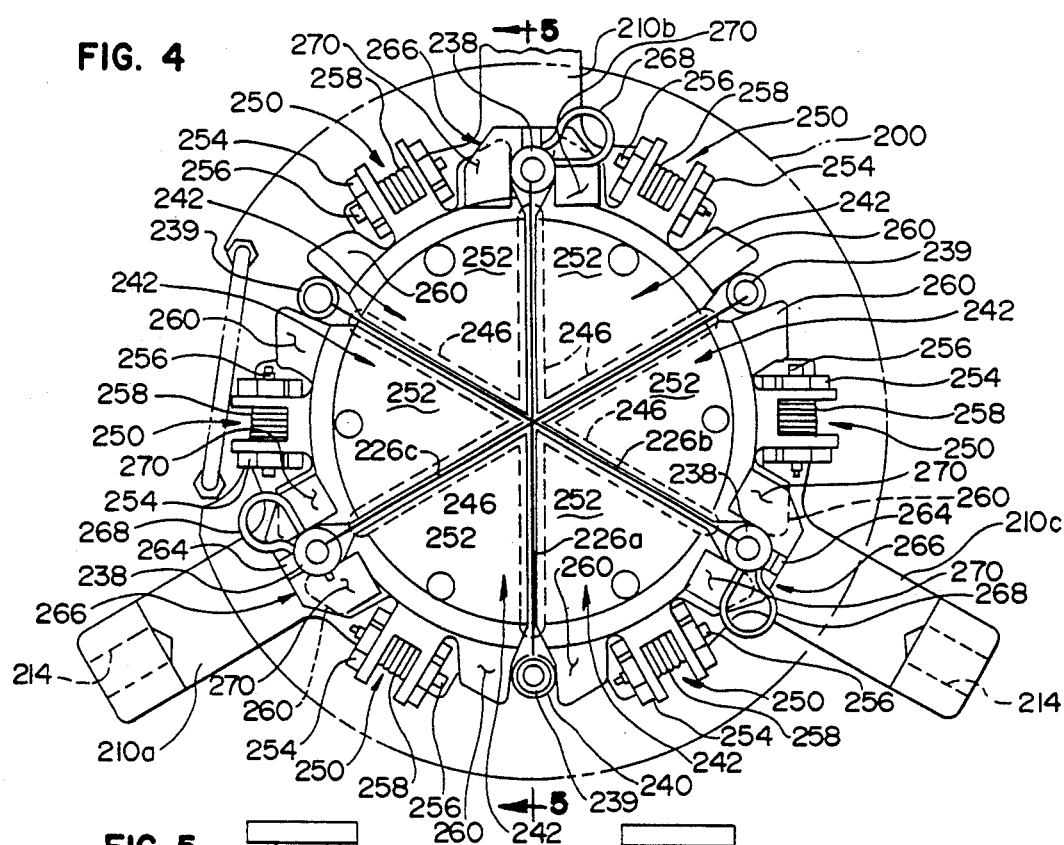
FIG. 4 is a top view of the blade and actuator assembly of the pressing apparatus of the present invention in the pressing position, showing the outer edge of the press disposed thereabove in phantom.

A suitable drive apparatus 20 is illustrated in FIGS. 2 and 3. The drive apparatus 20 is suitably secured to the housing 34 behind the drum 50, and includes a suitable motor 100 which rotates a pulley 102. The pulley 102 in turn drives a timing belt 104 drivably connected to a wheel 106, which through a suitable reducer 108 drives a drive shaft 110 axially aligned with the drum axis 48, preferably at about 20 revolutions per minute (to thereby cause 20 pieces of fruit to be squeezed per minute, as will become apparent).

The drive shaft 110 rotates a radial arm or crank 120 which in turn drives a crankshaft 122 which is secured to the back of the drum 50 to thereby rotate the drum 50

A horizontal yoke 130 is fixed to the top of a vertical drive shaft 132 which is suitably supported by a housing sleeve 134 for axial reciprocation. The yoke 130 includes a horizontal slot 136 through which the crankshaft 122 extends, so that one revolution of the drive shaft 110 causes the drum 50 to revolve once and the vertical drive shaft 132 to reciprocate up and down one complete cycle. A suitable bearing structure may be used to minimize friction between the crankshaft 122 and the yoke 130.

Secured to the vertical drive shaft 132 beneath the feed assembly 12 is the press 200 of the pressing apparatus 14 so that, as described in greater detail hereafter, the feed assembly 12 and the pressing apparatus 14 are synchronously driven.

The length of the stroke of the vertical drive shaft 132 is precisely controlled by the upper and lower limits of the crankshaft 122 as the drum 50 revolves (note the upper limit illustrated in phantom in FIG. 3). Further, a suitable adjustable connector 140 is provided between the yoke 130 and vertical drive shaft 132, to allow for precise selection of the lower limit of travel of the press 200. As described in greater detail hereafter, this connector 140 results in easy accommodation of different types and sources of fruit while still obtaining a maximum yield of high quality tasting juice Once a complete understanding of the present invention is obtained, it will be readily understood that still other drive mechanisms might also be used to provide the power to the apparatus 10. However, it will also be understood that the particular arrangement disclosed herein provides for ideal operation of the apparatus 10, driving both the feed assembly 12 and the pressing apparatus 14 in synchronization to reliably make juice with minimal operator attention required.

Pressing Apparatus

The structure of the pressing apparatus 14 will now be described in detail with particular reference to FIGS. 1 and 4-8.

Specifically, a support bar assembly includes three bars 202a-c which are suitably fixed on their lower ends to the transport base 18 and support the feed assembly housing 34 on their upper ends.

The blade and actuator assembly 206 (see particularly FIGS. 1, 4 and 5) include a central portion 208 from which three support arms 210a-c extend radially outwardly. The support arms 210a-c include locking screw openings 214 into which locking screws 216 (see FIGS. 4 and 5) in the support bars 202a-c may be secured to support the assembly 206 on the bars 202a-c.

Manually turnable knobs 218 on two of the locking screws 216 allow an operator to easily remove the screws 216, to thereby permit the entire assembly 206 (and connected components as discussed hereafter) to be removed for easy cleaning and/or replacement of parts.

It is preferred that suitable side panels 220 be provided to enclose the pressing apparatus 14 and thereby prevent an operator from being injured should he reach into the apparatus 14 while it is operating. It is also preferred that one of the panels 220, preferably the front panel, be transparent. This not only allows an operator to see whether the apparatus 10 is operating properly, but it also allows for customers to actually see the juice being freshly made.

Figure 6:
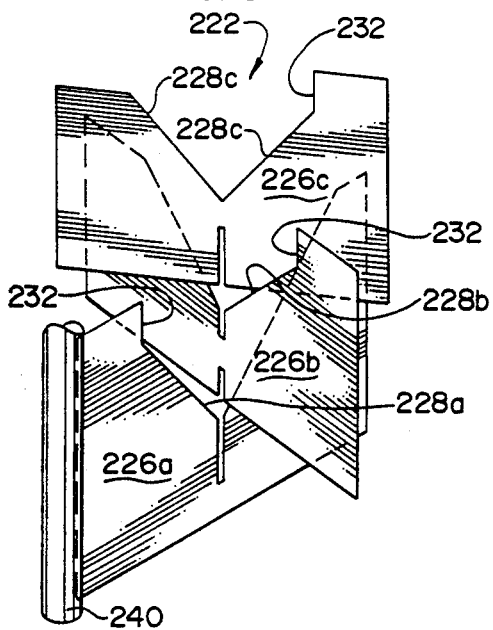
FIG. 6 is a perspective exploded view of the upright blades of the pressing apparatus.
Figure 11:
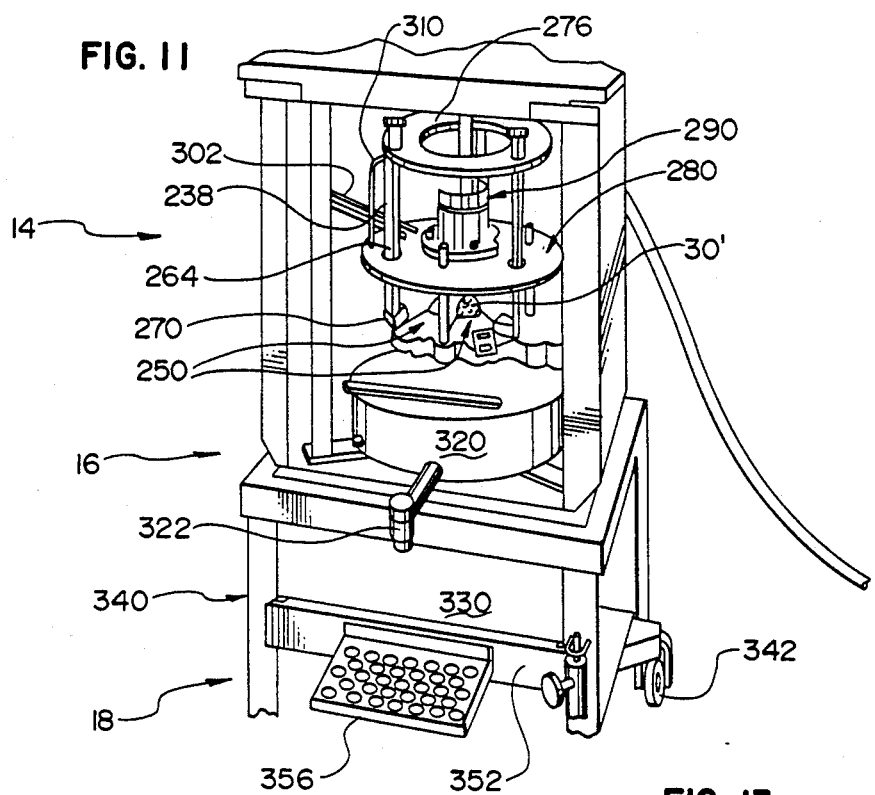

The central portion 208 of the blade and actuator assembly 206 supports an upright blade assembly 222, the assembly of which is illustrated in FIG. 6. Specifically, three blades 226a-c, each having upper cutting edges 228a-c sloped downwardly toward a central low point, are slotted so that they may be assembled with their central low points together defining the cutting position as described hereafter. Each of the blades 226a-c further has an upright stopping surface 232a-c adjacent one side of the cutting edge 228a-c.

Six support posts 238, 239 (three tall posts 338, and three short posts 239) are provided on the central portion 208, which posts 238 function to secure the blade assembly 222. Specifically, in the embodiment shown, five of the posts 238 include slots within which one side of a blade 226a-c is located, and a cylindrical blade guide 240 (see FIG. 6) is disposed over the sixth post 239 to ensure proper orientation of the blade assembly 222 relative to the feed chute 42. The support posts 238 are preferably evenly spaced so that, when secured, the blade assembly 222 will essentially define six equally spaced V-shaped segments 242 (see FIG. 4), each having a center angle of approximately 60 degrees.

Although it will become apparent that still other methods for securing the blade assembly 222 could be used, the particular structure shown has the advantage of ensuring that the stopping surfaces 232 of the blade assembly 222 will be properly oriented in the pressing apparatus 14 for proper operation as described further below. Further, the support posts 238 can also be used to guide the movement of the press 200.

The central portion 208 also includes six radially oriented slots 246 disposed generally beneath the blades 226a-c to allow the squeezed juice to drain therethrough as described further hereafter.

Figure 7:
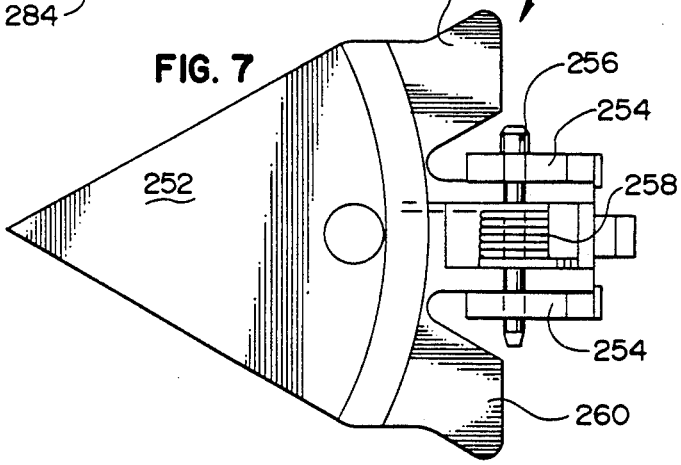
FIG. 7 is a plan view of an ejector.

Also supported on the central portion 208 are six ejectors 250, one of which is shown in FIG. 7. Each ejector 250 includes a generally triangular or pie shaped plate portion 252 secured to a bracket 254 by a pin 256 allowing pivotal motion therebetween. The ejector brackets 254 are securable to the blade and actuator assembly 206 so that, when the ejector plate portions 252 are disposed in a generally horizontal orientation, they are disposed in a ready position (as described further below) in the V-shaped segments 242 defined by the blade assembly 222.

Preferably, the ejector brackets 254 are received in generally vertical openings about the periphery of the central portion 208 so that they may be easily removed for cleaning.

A spring 258 is also provided about the pivot pin 256 of each ejector 250, which springs 258 bias the plate portions 252 upwardly toward an ejecting position clear of the V-shaped segments 242.

The ejectors 250 also include cam flanges 260 to assist in proper operation of the apparatus 10 in moving the ejectors 250 between the ready and ejecting positions. Three arm members 264 are secured at their upper ends to the three tall support posts 238 and support cam members 266 at their lower ends. Specifically, the arm members 264 are pivotally secured on their upper ends (as by the pins 268 shown) allowing the supported cam members 266 to pivot radially outwardly away from the posts 238. Preferably, the arm members 264 are themselves biased toward outward pivoting, although such a biasing force is also provided by the ejectors 250 as described below.

Specifically, each cam member 266 includes two cam portions 270 disposed on opposite sides of the support post 238. The cam portions 270 each engage the adjacent ejector cam flanges 260 so that, when the arm members 264 are forced inwardly toward their associated support posts 238, the cam portions 270 force the associated ejector plate portions 252 to their ready position. Conversely, when the arm members 264 are not forced inwardly, the ejectors 250 will snap up into their ejecting position with the arm members 264 also pivoted outwardly.

Threaded knobs 274 secure a ring 276 to the three tall support posts 238 to ensure that the posts 238 maintain their proper orientation. Further, the knobs 274 allow the ring 276 to be easily removed to allow the blade assembly 222, as well as the press 200, to be easily removed from the blade and actuator assembly 206, as for maintenance and/or cleaning.

Figure 5:
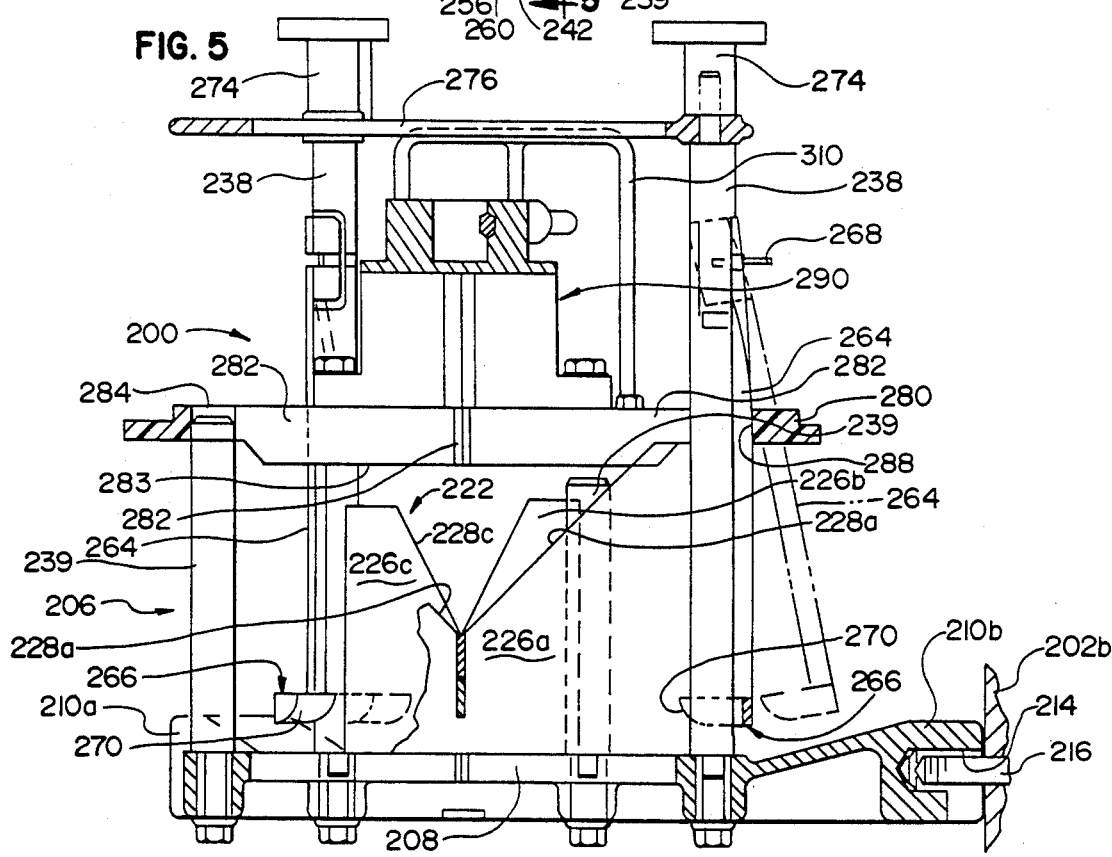
FIG. 5 is a partially broken, side cross-sectional view of the pressing apparatus of the present invention taken generally from the perspective of line 5—5 of FIG. 4, with the press included and the ejectors omitted.
Figure 8:
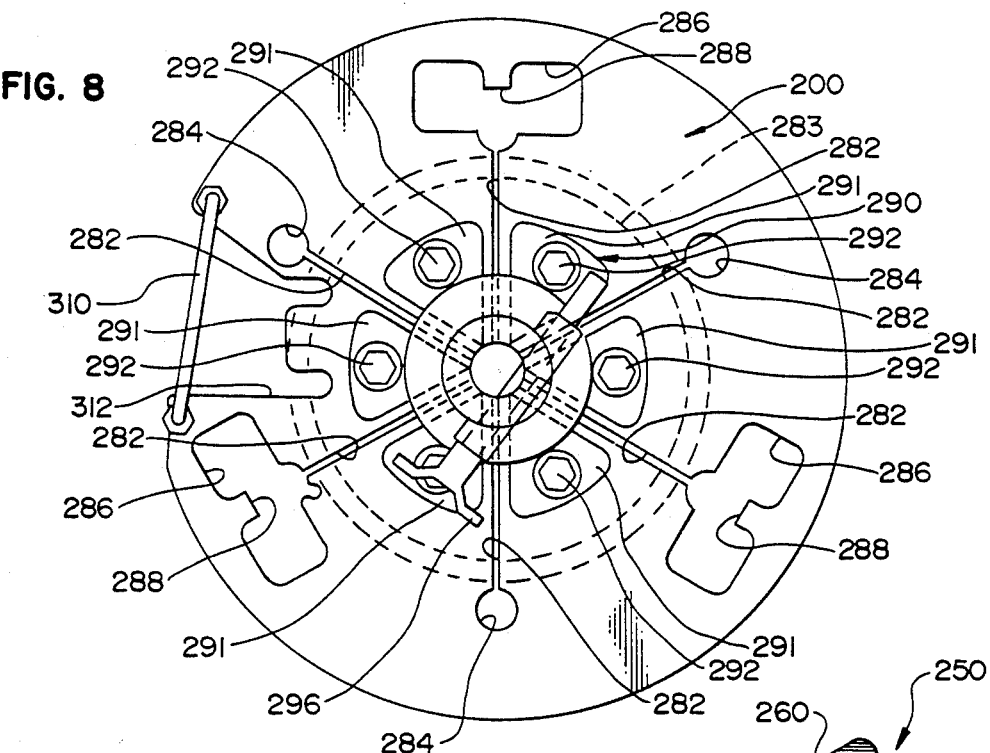
FIG. 8 is a top view of the press of the pressing assembly of the present invention.

Referring now to the details of the press 200 (as best shown in FIG. 8), a pressing plate 280 includes six radial slots 282, and defines a bottom pressing face 283. Three of the radial slots 282 include cylindrical openings 284 allowing the pressing plate 280 to be reciprocated vertically past the short support posts 239. The slots 282 similarly allow reciprocation over the blade assembly 222, as is shown with one blade 226 in the rough schematic representation of the press 200 in FIG. 3 (details of the press 200 are illustrated in FIGS. 5 and 8, and many such details are omitted and/or simplified in FIG. 3 for clarity). The other three radial slots 282 include cam openings 286 at their outer ends, where the cam openings 286 allow the pressing plate 280 to move over the tall support posts 238, and also include cam surfaces 288 which engage the cam arm members 264 to force them radially inwardly as the pressing plate 280 moves down toward the blade assembly 222.

A press bracket 290 having radial space therein to avoid interference with the blade assembly 222 during operation is secured to the top of the pressing plate 280. Specifically, the bracket 290 includes six wedge shaped upright portions 291 suitably secured to the plate 280, as by the bolts 292 shown, where a collar portion 294 is fixed to the top of the upright bracket portions 291. A quick release pin 296 is provided in the collar portion 294, allowing the collar portion 294 to be easily connected to or disconnected from the vertical drive shaft 132 (as is desired during maintenance and/or cleaning) so that the press bracket 290 is reciprocated vertically by the drive shaft 132 when connected thereto.

Further, it will be apparent that the entire blade and actuator assembly 206 together with the press 200 may be easily removed for maintenance and/or cleaning by simply removing the pin 296 and disengaging two of the locking screws 216.

As best illustrated in FIG. 1, the feed chute 42 opens onto a feed bracket assembly 300 which preferably includes a pair of parallel feed bars 302 (only one of which can be seen in FIG. 1) sloped down toward the blade assembly 222 to direct a rolling piece of fruit into a cutting position on top of the blade assembly 222. Side bars 304 are also provided (spaced apart a distance sufficient to allow the fruit to pass by) to ensure that the fruit goes as directed by the feed bars 302.

It has been found that spring loading the feed bars 302 is preferable so that, in the unlikely event of fruit becoming jammed in the bracket assembly, the feed bars 302 will swing out of the way rather than be bent or otherwise damaged. Further, it has been found that provision of a swinging deflector 306 at the bottom of the chute 42 functions effectively to slow down fruit which might have dropped through the chute 42 in a manner which would cause it to shoot off of the feed bars 302 too quickly.

The press 200 also supports a gate 310 disposed on the side facing the feed bracket assembly 300 to control feeding of fruit to the blade assembly 222 as will be described further below. Further, the pressing plate 280 includes a cutout adjacent the gate 310, allowing the feed bars 302 to extend outwardly sufficiently so that the fruit will be reliably discharged into the cutting position without interfering with the reciprocating pressing plate 280.

Collecting Portion

The collecting portion 16 of the apparatus 10 includes a juice pan 320 disposed beneath the blade and actuator assembly central portion 208. The pan 320 is essentially open on the top, although it preferably includes a suitable filter or screen (not shown) to catch excess pulp, and a scraper can also be provided in conjunction with such a screen to break up any clumps of pulp which might excessively hinder passage of the fruit juice into the pan 320.

The pan 320 also includes a faucet 322 with a handle 324, allowing the fresh squeezed juice to be drained directly into the desired container. For example, in a store setting, the customer can see the juice being made, the juice can be drained into the container in which it is to be sold, and the container handed directly to the customer who can purchase it with no doubts as to the freshness of the juice.

A float assembly (not shown) may also be provided to indicate how full the pan 320 becomes, and a suitable switch can be connected to the float assembly to automatically stop the apparatus 10 when the pan 320 becomes full, thereby allowing an operator to leave the machine running without paying full attention to it without risk of having fruit juice overflow.

The collecting portion 16 further includes a peel disposal basket 330 located beneath the pan 320, which is suitably supported so as to allow passage of squeezed peels around it (as described hereafter), where a funnel portion 334 also serves to direct peels into the basket 330. (A suitable plastic garbage bag may be located in the basket 330 to allow for quick and clean disposal of peels when desired.) The basket 330 also functions to catch any overflow from the pan 320 to prevent spilling onto the floor in the event that should occur.

Transport Base

The transport base 18 consists of a frame assembly 340 supported on casters 342. Accordingly, the entire apparatus 10 may be easily moved. Such functioning is important in many uses including, for example, in grocery stores where it is desired to keep the apparatus 10 open to viewing by customers, while often moving it to another location for cleaning. Since cleaning of this apparatus 10 can often be accomplished merely by spraying water over the pressing apparatus 14, cleaning can be completed easily simply by rolling the apparatus 10 to an area with suitable floor drainage and then doing so. Further, as a result of the simplicity of cleaning, as a practical matter, cleaning will actually be done when it should be (operators tend to put off cleaning when it is difficult and/or time consuming) to thereby result in reliable sanitary conditions for the juice produced by this apparatus 10.

The frame assembly 340 also includes a suitable shelf 344 for supporting the disposal basket 330 in a proper position underneath the funnel portion 334, and further includes an upper weldment 346 suitable to support the feeding assembly 12 and pressing apparatus 14 thereabove.

A bottle support 350 is provided on the transport base 18, including a plate 352 pivotally and slidably supported on one end to a shaft 354 fixed to the frame assembly 340. The plate 352 supports a shelf unit 356 disposed beneath the pan faucet 322, which shelf unit 356 may be used to support a bottle for filling from the faucet 322. The plate 352 may be moved up or down depending on the height of the bottle being filled, and the plate 352 may be pivoted outwardly in order to allow the peel disposal basket 330 to be removed for easy disposal of the peels when necessary. Suitable means, such as detents and/or thumbscrews, may be provided to secure the plate 352 and supported shelf unit 356 in the desired position when filling bottles with juice.

Control

As will be readily seen by a person who has obtained an understanding of the above described structure, control of the apparatus 10 is accomplished through mechanical means driven by a single motor 100. No complex electrical control is required.

In order to operate the apparatus 10, therefore, all an operator needs to do is put fruit in the hopper 76 and hit the START switch 360 (see FIG. 1). When he has made enough juice, he simply needs to hit the STOP switch 362.

It is, however, desirable to provide a control to automatically stop the apparatus under various conditions. Specifically, in addition to a switch for automatically shutting off the apparatus 10 should the pan 320 become full as previously mentioned, suitable switches 364 such as proximity switches are also preferably provided with all openable housing components (particularly the pressing apparatus side panels 220) to automatically shut off the apparatus 10 for safety reasons should any of those panels be opened during operation (and to prevent the apparatus 10 from even being started if all housing components are not properly in place).

Operation

Operation of the above described apparatus 10 in making juice from oranges 30 as illustrated is as follows. The description here relates to a single cycle of the apparatus 10 in squeezing one orange 30 to extract the juice therefrom. The apparatus 10 typically will operate at about twenty cycles per minute, and therefore, one cycle takes only about three seconds.

Specifically, the feed assembly drum 50 rotates, with the hopper 76 feeding oranges 30 into the staging chamber 52, which together with the feed chamber 54 and restricted opening 56 is appropriately dimensioned for the oranges 30 by the insert 62. Specifically, the axial depth of the chambers 54, 56 is less than twice the diameter of the oranges, preferably no more than 1.5 times the orange diameter. Further, the restricted opening 56 and the radial dimension of the feed chamber 54 are also preferably no more than 1.5 times the diameter of the oranges. With such dimensions, no more than one orange 30 will be fully disposed in the feed chamber 54, pushed by the feed surface 72 toward the feeding position of the drum 50.

When the drum 50 reaches the feeding position, with the feed chamber 54 adjacent the open side 38 of the enclosure 36, the downward slope of the feed surface 72 and the feed ramp 40 will allow the orange 30 to roll out of the feed chamber 54 and into the chute 42. With the above mentioned dimensions in the chambers 52, 54 and restricted opening 56, at most a second orange will be less than halfway in the feed chamber 54. Therefore, that second orange will not fall into the chute 42 behind the first orange 30, but rather will fall back into the staging chamber 52. Further, due to the previously mentioned orientation of the lead surface 70 (sloped downwardly away from the enclosure open side 38 when the drum 50 is in the feeding position), the possibility that the weight of other oranges in the staging chamber 52 might force a second orange out the enclosure open side 38 is eliminated.

Continued rotation of the drum 50 will eventually cause a subsequent orange to move into the feed chamber 54 (as in the drum position shown in FIG. 1), ready to feed a second orange to the chute 42 during the second revolution of the drum 54.

Synchronous operation of the pressing apparatus 14 will now be described, with particular reference being made to the sequence of positions shown in FIGS. 9-13. As should now be understood, the above described drive apparatus 20 will cycle the feed assembly 12 and pressing apparatus 14 together. As will become apparent from the below description, the exact synchronization required will depend on the time delay between the exiting of a piece of fruit from the feed chamber 54 to its presentation on the feed bracket assembly 300, which time delay depends on such factors as the height of the chute 42, the delay caused by the deflector 306, and the length and slope of the feed bars 302.

When properly synchronized, an orange 30 is slowed by the deflector 306 and begins rolling down the feed bars 302 as the press 200 moves up with its gate 310 blocking the orange 30. As the press 200 moves up further, it eventually reaches a feed position in which it is above the orange 30 with the gate 310 no longer blocking the orange 30, as shown in FIG. 9.

At this point, the orange 30 rolls further down and off of the feed bars 302, falling off their end as shown in FIG. 10 and onto the blade assembly 222. The upright stopping surfaces 232 on the blades 226a-c help to ensure that the orange 30 does not overshoot the blade assembly 222, and instead reliably comes to rest in the central cutting position defined by the downwardly sloped blade cutting edges 228a-c.

The press 200 then begins reciprocating back down, with its cam surfaces 288 sliding down the arm members 264, thereby forcing them radially inwardly. As a result, the cam portions 270 supported on the bottom of the arm members 264 are also forced inwardly against the cam flanges 260 of the ejectors 250, thereby pivoting the ejectors 250 down with their plate portions 252 in a ready position substantially horizontal within the V-shaped segments 242 between the blades 226a-c.

Further downward motion of the press 200 causes the pressing face 283 to push the orange 30 down onto the blade assembly 222, essentially resulting in the orange 30 being cut into six substantially equal segments (see reference numeral 30' in FIG. 11) which fall onto the ejectors 250.

Figure 12:
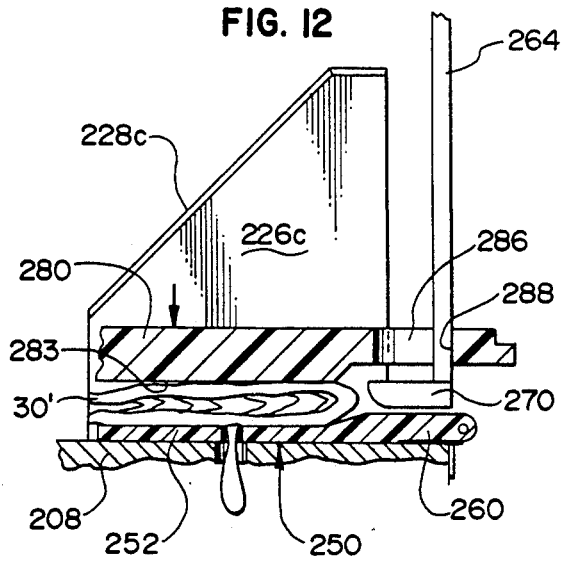

Downward motion of the press 200 continues until the pressing plate 280 is in the pressing position, squeezing the orange segments 30' between its pressing surface 283 and the ejectors 250, as shown in FIG. 12. The juice which is squeezed from the segments 30' flows around the sides of the ejector plate portions 252 and through slots 246 in the blade and actuator assembly central portion 208 to the juice pan 320, where it is collected and can be dispensed as previously discussed.

The spacing of the ejector plate portions 252 and the pressing surface 283 at the extreme low point of the reciprocation of the pressing plate 280 defines the maximum squeezing of the orange segments 30'. As previously discussed, a trade-off must be made in order to obtain the optimum amount of squeezing (that is, it is desirable to squeeze it enough to get as much juice as possible without squeezing so much that undesirable peel oil is squeezed out to detract from the flavor). Further, in view of the different peel thicknesses which can be encountered for different types of fruit, as well as among different batches of the same fruit, the previously discussed adjustable connector 140 may be easily used to adjust the downstroke of the vertical drive shaft 132 and connected press 200 to ensure optimum operation whatever the condition of the fruit.

Figure 13:
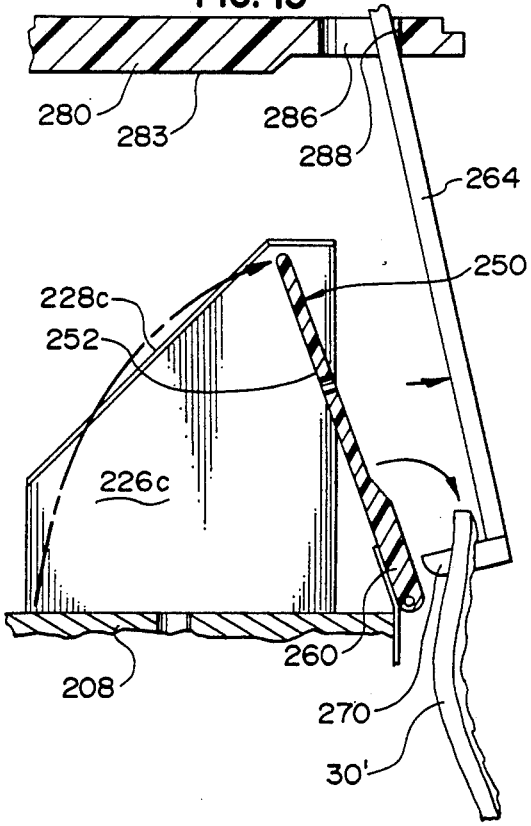

Following squeezing of the fruit segment 30', the press 200 automatically moves back up toward the feed position. As it does so, it moves its gate 310 in front of the feed bracket assembly 300 to temporarily prevent the next orange from dropping onto the blade assembly 222 until the press 200 is clear. Further, as illustrated in FIG. 13, further upward motion of the press plate 280 releases the arm members 254, and the ejector springs 258 snap the ejector plate portions 252 up into an ejecting position, essentially throwing the peel remnants of the orange segments 30' outwardly into the funnel portion 334 which directs them to the disposal basket 330.

Subsequently fed oranges are similarly handled.

In summary, the apparatus 10 of the present invention provides ideal operating characteristics. It is readily adaptable to make juice from different types of fruit having widely ranging sizes, such as grapefruits, oranges, and lemons. Further, it may be used cost effectively in locations in which only intermittent use to produce limited amounts of juice is desired. While allowing such usage, however, the apparatus still produces maximum yields of juice with the highest quality taste. Still further, the apparatus may be easily and inexpensively maintained and operated with minimal operator attention required.

Still other aspects, objects, and advantages of the present invention can be obtained from a study of the specification, the drawings, and the appended claims.

We claim:

1. A pressing apparatus for extracting juice from citrus fruit, comprising:
    upright blades extending radially outwardly from a generally vertical upright axis to define V-shaped segments therebetween, the upper edges of said blades being generally sloped downwardly toward said upright axis to generally support a piece of fruit centrally to said upright axis;
    peel ejectors within each of said V-shaped segments, each of said peel ejectors comprising a generally triangular plate pivotally supported for movement between a generally horizontal ready position and an ejecting position generally sloped downwardly away from the upright axis;
    a press supported for vertical reciprocation, said press including slots therein allowing said press to pass over said blades;
    means for reciprocably driving the press between an upper feed position allowing a piece of fruit to be located on said upright blades and a lower pressing position a selected spacing above the peel ejectors;
    means for disposing said peel ejectors in their ready position when said press is moved toward the pressing position; and
    means for pivoting said peel ejectors toward their ejecting position when said press is moved toward the feed position.

2. The apparatus of claim 1, wherein said driving means comprises a drive motor with an output reciprocating between upper and lower positions;
    a generally vertical shaft mounted for axial reciprocation and connected on its lower end to the press; and
    means for adjustably connecting said vertical shaft to said drive motor output to allow for selective adjustment of said pressing position.

3. The apparatus of claim 1, wherein said disposing and pivoting means comprise:
    cam members operable to selectively position said peel ejectors in their ready position; and
    means carried by said press for operating said cam members when said press is moved from the feed position to the pressing position.

4. The apparatus of claim 3, further comprising means for biasing said peel ejectors toward their ejecting position.

5. The apparatus of claim 4, further comprising:
    arm members fixed on their upper ends and supporting said cam members on their lower ends to bias said cam members laterally away from the upright axis;
    wherein said operating means comprises cam surfaces carried with said press and engaging said arm members as said press is moved from the feed position to the pressing position to move said supported cam members into engagement with said peel ejectors selectively positioning said peel ejectors in their ready position.

6. The apparatus of claim 1, further comprising:
    a feed chute oriented to direct a piece of fruit toward a cutting position on top of the blades and generally centered on the upright axis;
    means for feeding a piece of fruit to said feed chute when said pres is moved toward the feed position; and
    a gate on said press disposed to block a piece of fruit from exiting said chute until said press is in the feed position.

7. The apparatus of claim 6, wherein said feeding means comprises:
    a cylindrical enclosure open on one side to the chute;
    a feed drum supported for rotation about a horizontal axis within the enclosure, said drum including
        a side opening,
        a feed chamber adjacent the side opening and substantially closed on both axial ends, said feed chamber being defined by a lead surface and a feed surface between said closed ends, and
        a staging chamber radially inward from the feed chamber and open thereto through a restricted opening, said staging chamber being substantially closed on one axial end and open on the other end;

means for rotating said drum in a direction in which the lead surface leads the feed chamber and the feed surface follows the feed chamber; and a hopper for citrus fruit, said hopper being sloped toward the drum staging chamber open end.

8. The apparatus of claim 7, wherein once per revolution the drum is in a feeding position in which the drum open side is adjacent the chute with the feed surface sloped downwardly toward the chute.

9. The apparatus of claim 7, further comprising a feed ramp at the bottom of the cylindrical enclosure open side, said feed ramp being downwardly sloped from the enclosure to the chute.

10. The apparatus of claim 7, wherein said lead surface further defines one side of the staging chamber and is downwardly sloped away from the drum side opening when said drum is disposed in a feeding position.

11. The apparatus of claim 7, wherein said feed chamber has a radial dimension relative to the drum axis which is less than approximately 1.5 times the diameter of the citrus fruit.

12. The apparatus of claim 7, wherein the restricted opening between said staging chamber and said feed chamber is less than two times the diameter of the citrus fruit.

13. The apparatus of claim 7, wherein the axial ends of the feed chamber are spaced apart a distance less than two times the diameter of the citrus fruit.

14. The apparatus of claim 7, wherein the feed and staging chambers accommodate grapefruits, and further comprising an insert selectively securable within said feed and staging chambers to reduce the effective dimensions of said feed chamber, staging chamber and restricted opening to accommodate oranges.

15. The apparatus of claim 7:
wherein the rotating means comprises
a drive shaft aligned with the drum axis,
a driven member on the drum and radially spaced from the drum axis, and
a radial arm connecting said drive shaft and said driven member; and
further comprising means for cyclically operating the juice press with said feeding means, including
a generally vertical shaft mounted for axial reciprocation and connected on its lower end to the press, and
a yoke secured to said reciprocable shaft and including a horizontal slot slidably receiving said rotating means driven member.

16. The apparatus of claim 7, wherein the bottom surface of the staging chamber when the drum is in the feeding position is sloped downwardly away from the restricted opening.

17. A pressing apparatus for extracting juice from citrus fruit, comprising:
upright blades extending radially outwardly from a generally vertical upright axis to define V-shaped segments therebetween, the upper edges of said blades being generally sloped downwardly toward said upright axis to generally support a piece of fruit centrally to said upright axis;

peel ejectors within each of said V-shaped segments, each of said peel ejectors comprising a generally triangular plate pivotally supported for movement between a generally horizontal ready position and an ejecting position generally sloped downwardly away from the upright axis;

means for biasing said peel ejectors toward said ejecting position;

a press supported for vertical reciprocation, said press including slots therein allowing said press to pass over said blades;

means for reciprocably driving the press between an upper feed position allowing a piece of fruit to be located on said upright blades and a lower pressing position a selected spacing above the peel ejectors;

cam members operable to selectively position said peel ejectors in their ready position;

arm members fixed on their upper ends and on their lower ends biasing said cam members laterally away from the upright axis; and cam surfaces carried with said press and engaging said arm members as said press is moved from the feed position to the pressing position to operate said cam members to selectively position said peel ejectors in their ready position.

18. The apparatus of claim 17, wherein said driving means comprises a drive motor with an output reciprocating between upper and lower positions;
a generally vertical shaft mounted for axial reciprocation and connected on its lower end to the press; and
means for adjustably connecting said vertical shaft to said drive motor output to allow for selective adjustment of said pressing position.

19. The apparatus of claim 17 further comprising:
a feed chute oriented to direct a piece of fruit toward a cutting position on top of the blades and generally centered on the upright axis;
means for feeding a piece of fruit to said feed chute when said press is moved toward the feed position; and
a gate on said press disposed to block a piece of fruit from exiting said chute until said press is in the feed position.

20. The apparatus of claim 19, wherein said feeding means comprises:
a cylindrical enclosure open on one side to the chute;
a feed drum supported for rotation about a horizontal axis within the enclosure, said drum including
a side opening,
a feed chamber adjacent the side opening and substantially closed on both axial ends, said feed chamber being defined by a lead surface and a feed surface between said closed ends, and
a staging chamber radially inward from the feed chamber and open thereto through a restricted opening, said staging chamber being substantially closed on one axial end and open on the other end;
means for rotating said drum in a direction in which the lead surface leads the feed chamber and the feed surface follows the feed chamber; and
a hopper for citrus fruit, said hopper being sloped toward the drum staging chamber open end.

21. A pressing apparatus for automatically extracting juice from citrus fruit, comprising:
upright blades extending radially outwardly from a generally vertical upright axis to define V-shaped segments therebetween, the upper edges of said blades being generally sloped downwardly toward said upright axis to generally support a piece of fruit centrally to said upright axis;

a feed chute oriented to direct a piece of fruit toward a cutting position on top of the blades and generally centered on the upright axis;

a cylindrical enclosure supported above said blades and open on one side to the chute;

a feed drum supported for rotation about a horizontal axis within the enclosure, said drum including
a side opening,
a feed chamber adjacent the side opening and substantially closed on both axial ends, and
a staging chamber radially inward from the feed chamber and open thereto through a restricted opening, said staging chamber being substantially closed on one axial end and open on the other end;

means for rotating said drum about the horizontal axis;

a hopper for citrus fruit, said hopper being sloped toward the drum staging chamber open end.

peel ejectors within each of said V-shaped segments;

a press supported for vertical reciprocation, said press including slots therein allowing said press to pass over said blades;

means for reciprocably driving the press between an upper feed position allowing a piece of fruit to be located on said upright blades and a lower pressing position a selected spacing above the peel ejectors;

means for disposing said peel ejectors in their ready position when said press is moved toward the pressing position; and means for pivoting said peel ejectors toward their ejecting position when said press is moved toward the feed position.

22. The apparatus of claim 21, wherein each of said peel ejectors comprises a generally triangular plate pivotally supported for movement between a generally horizontal ready position and an ejecting position generally sloped downwardly away from the upright axis 23. The apparatus of claim 21, wherein said rotating and driving means comprise:
a drive shaft aligned with the horizontal axis;
means for connecting said drive shaft to rotatably drive said drum;
a generally vertical shaft mounted for axial reciprocation and connected on its lower end to the press, and
means for connecting said vertical shaft to said drive shaft to drive said vertical shaft up and down one time per revolution of said drum to cyclically drive the press in synchronization with said drum.

24. The apparatus of claim 23, further comprising a gate on said press disposed to block a piece of fruit from exiting said chute until said press is in the feed position.

25. The apparatus of claim 23 further comprising a drum driven member radially spaced from the horizontal axis, and wherein said connecting means comprises a yoke secured to said vertical shaft and including a horizontal slot slidably receiving said drum driven member.

26. The apparatus of claim 21 wherein said disposing and pivoting means comprise:
cam members operable to selectively position said peel ejectors in their ready position; and
means carried by said press for operating said cam members when said press is moved from the feed position to the pressing position.

27. The apparatus of claim 26, further comprising means for biasing said peel ejectors toward their ejecting position.

28. The apparatus of claim 27, further comprising:
arm members fixed on their upper ends and supporting said cam members on their lower ends to bias said cam members laterally away from the upright axis;
wherein said operating means comprises cam surfaces carried with said press and engaging said arm members as said press is moved from the feed position to the pressing position to move said supported cam members into engagement with said peel ejectors selectively positioning said peel ejectors in their ready position.

29. The apparatus of claim 21, wherein once per revolution the drum is in a feeding position in which the drum open side is adjacent the chute with the feed surface sloped downwardly toward the chute.

30. The apparatus of claim 21, further comprising a feed ramp at the bottom of the cylindrical enclosure open side, said feed ramp being downwardly sloped from the enclosure to the chute.

31. The apparatus of claim 21 wherein said feed a radial dimension relative to the drum axis which is less than approximately 1.5 times the diameter of the citrus fruit.

32. The apparatus of claim 21, wherein the restricted opening between said staging chamber and said feed chamber is less than two times the diameter of the citrus fruit.

33. The apparatus of claim 21, wherein the axial ends of the feed chamber are spaced apart a distance less than two times the diameter of the citrus fruit.

34. The apparatus of claim 21, wherein the feed and staging chambers accommodate grapefruits, and further comprising an insert selectively securable within said feed and staging chambers to reduce the effective dimensions of said feed chamber, staging chamber and restricted opening to accommodate oranges.

35. The apparatus of claim 21, wherein the bottom surface of the staging chamber when the drum is in the feeding position is sloped downwardly away from the restricted opening.

36. A pressing apparatus for extracting juice from citrus fruit, comprising:
upright blades extending radially outwardly from a generally vertical upright axis to define V-shaped segments therebetween, the upper edges of said blades being generally sloped downwardly toward said upright axis to generally support a piece of fruit centrally to said upright axis;

a cylindrical enclosure supported above said blades and open on one side to a generally vertical chute, said chute directing a piece of fruit fed thereto toward the upper edges of said blades;

a feed drum supported for rotation about a horizontal axis within the enclosure, said drum including
a side opening,
a feed chamber adjacent the side opening and substantially closed on both axial ends which are spaced apart a distance less than two times the diameter of the citrus fruit, said feed chamber being defined by a lead surface and a feed surface between said closed ends and having a radial dimension relative to the drum axis which is less than approximately 1.5 times the diameter of the citrus fruit, and a staging chamber radially inward from the feed chamber and open thereto through a restricted opening which is less than two times the diameter of the citrus fruit, said staging chamber being substantially closed on one axial end and open on the other end;

a hopper for citrus fruit, said hopper being sloped toward the drum staging chamber open end;

peel ejectors within each of said V-shaped segments, each of said peel ejectors comprising a generally triangular plate pivotally supported for movement between a generally horizontal ready position and an ejecting position generally sloped downwardly away from the upright axis;

means for biasing said peel ejectors toward said ejecting position;

a press supported for vertical reciprocation, said press including slots therein allowing said press to pass over said blades;

means for rotating said drum in a direction in which the lead surface leads the feed chamber and the feed surface follows the feed chamber, said drum being rotated whereby once per revolution the drum is in a feeding position in which the drum open side is adjacent the chute with the feed surface sloped downwardly toward the chute and the bottom surface of the staging chamber sloped downwardly away from the restricted opening;

means for reciprocably driving the press between an upper feed position allowing a piece of fruit to be located on said upright blades and a lower pressing position a selected spacing above the peel ejectors, said driving means to cyclically drive the press in synchronization with said feed drum;

cam members operable to selectively position said peel ejectors in their ready position;

arm members fixed on their upper ends and on their lower ends biasing said cam members laterally away from the upright axis; and cam surfaces carried with said press and engaging said arm members as said press is moved from the feed position to the pressing position to operate said cam members to selectively position said peel ejectors in their ready position.

* * * * *

UNITED STATES PATENT AND TRADEMARK OFFICE
CERTIFICATE OF CORRECTION

PATENT NO. : 5,182,984

DATED : February 2, 1993

INVENTOR(S) : Richard C. Wagner and William L. Carroll

It is certified that error appears in the above-identified patent and that said Letters Patent is hereby corrected as shown below:

On the title page, Item
[75] Inventors: Richard C. Wagner, Frankfort, Ill.
  --William L. Carroll, Huntington Beach, Cal.--

Signed and Sealed this

Eighth Day of February, 1994

*Attest:*

BRUCE LEHMAN

*Attesting Officer*  *Commissioner of Patents and Trademarks*